United States Patent
Oya (10) Patent No.: US 9,996,776 B2
(45) Date of Patent: Jun. 12, 2018

(54) PRINTING APPARATUS, CONTROL METHOD FOR PRINTING APPARATUS, AND STORAGE MEDIUM TO AVOID PERFORMING SHEET TYPE DETECTION IN PRINTING

(71) Applicant: CANON KABUSHIKI KAISHA, Tokyo (JP)

(72) Inventor: Hiroshi Oya, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/189,444

(22) Filed: Jun. 22, 2016

(65) Prior Publication Data
US 2016/0378414 A1  Dec. 29, 2016

(30) Foreign Application Priority Data
Jun. 24, 2015  (JP) .................. 2015-126895

(51) Int. Cl.
*G06F 3/12* (2006.01)
*G06K 15/00* (2006.01)

(52) U.S. Cl.
CPC ......... *G06K 15/4065* (2013.01); *G06F 3/121* (2013.01); *G06F 3/1234* (2013.01); *G06F 3/1285* (2013.01)

(58) Field of Classification Search
None
See application file for complete search history.

(56) References Cited

U.S. PATENT DOCUMENTS

2002/0054322 A1 * 5/2002 Geelen .................. G06F 3/1207
358/1.15
2012/0002223 A1 * 1/2012 Tanaka ..................... B41J 11/00
358/1.9

FOREIGN PATENT DOCUMENTS

JP 2009-265627 A 11/2009
JP 2014018976 A * 2/2014

* cited by examiner

*Primary Examiner* — Thomas D Lee
(74) *Attorney, Agent, or Firm* — Canon U.S.A., Inc. IP Division

(57) ABSTRACT

A printing apparatus includes a detecting unit, a determination unit, a holding unit, and an instruction unit. The detecting unit detects a sheet type of a sheet used for a print job. The determination unit determines, in a case where a cassette is opened, whether the cassette is used for the print job and the print job is suspended because of a sheet empty state. The holding unit holds, in a case where the determination unit determines that the cassette is used for the print job and the print job is suspended because of the sheet empty state, the sheet type detected by the detecting unit. The instruction unit instructs, in a case where printing is restarted, a printer unit to restart printing of the print job using the sheet type held by the holding unit.

16 Claims, 11 Drawing Sheets

| | SHEET TYPE DETECTION RESULT | SHEET TYPE DETECTION RESULT HOLD FLAG |
|---|---|---|
| CASSETTE 1 | THICK PAPER | OFF |
| CASSETTE 2 | PLAIN PAPER 1 | ON |
| CASSETTE 3 | THIN PAPER | OFF |
| CASSETTE 4 | EMPTY | OFF |

|  | SHEET TYPE DETECTION RESULT | SHEET TYPE DETECTION RESULT HOLD FLAG | PERFORMANCE DETERIORATION OCCURRENCE DUE TO SHEET TYPE DETECTION |
|---|---|---|---|
| CASSETTE 1 | THICK PAPER | OFF | YES |
| CASSETTE 2 | PLAIN PAPER 1 | ON | NO |
| CASSETTE 3 | THIN PAPER | OFF | NO |
| CASSETTE 4 | EMPTY | OFF | NO |

FIG.10

PRINTING APPARATUS, CONTROL METHOD FOR PRINTING APPARATUS, AND STORAGE MEDIUM TO AVOID PERFORMING SHEET TYPE DETECTION IN PRINTING

BACKGROUND OF THE INVENTION

Field of the Invention

The present invention relates to a printing apparatus, a control method, and a storage medium, capable of reducing performance deterioration due to sheet type detection performed at a printing restart time from a sheet empty state.

Description of the Related Art

An image forming apparatus such as a printer receives a print job from an external apparatus such as a personal computer (PC), and compares sheet feeding setting information (i.e., sheet setting information and cassette specification) described in the received print job and sheet setting information of sheets set in a cassette of the image forming apparatus. Then, based on the result of comparison, the image forming apparatus selects a cassette in which suitable sheets are set (a sheet feed port including a manual feed tray is referred to as a cassette) and executes printing. The sheet setting information of each cassette includes a sheet size and a sheet type (e.g., plain paper, thick paper), and according to the sheet setting information, the image forming apparatus adjusts a conveyance speed of a sheet and a fixing temperature of toner at a printing unit and executes printing.

The sheet setting information of each cassette includes a case where a user sets the sheet setting information manually, and a case where the image forming apparatus detects the set sheets by a sensor to automatically set the sheet setting information. Conventionally, there have been image forming apparatuses capable of detecting a sheet size by a sensor, and recently, image forming apparatuses capable of detecting a sheet type (e.g., plain paper, thick paper) automatically by a sensor, have been already available. With this sheet type detection, a user needs not manually set the sheet type when the user sets sheets in a cassette, so that convenience of the image forming apparatus is enhanced. However, this sheet type detection is performed while a sheet is being conveyed from a cassette, not in a state where the sheet is set in the cassette. Accordingly, the sheet type detection is performed on print jobs after the user sets sheets in the cassette, and the detection result is registered as sheet setting information of the cassette. The registered sheet setting information needs to be deleted when the sheet replacement may have been performed (e.g., a cassette is opened and closed or power is off and on), and the sheet type detection has to be performed again. However, performance of the image forming apparatus may be deteriorated if the sheet type detection is performed during printing. When the sheet type detection is not to be performed, the image forming operation is performed according to the sheet type already set by a user, so that the image forming operation can be started before feeding a sheet from a cassette. However, when the sheet type detection is performed, the image forming operation is started after conveying a sheet to the position of a sensor and detecting the sheet, whereby a time period for waiting the completion of the image forming operation. As a result, performance thereof may be deteriorated. This performance deterioration tends to occur more easily at a sheet feed port located farther from the sensor position.

In order not to deteriorate performance in such a case, Japanese Patent Application Laid-open No. 2009-265627 discusses a technique in which the sheet type detection has been performed beforehand in printing according to a setting with which a specified sheet type is used to perform printing, not according to a setting with which a sheet type detection is automatically performed.

In the technique discussed in Japanese Patent Application Laid-open No. 2009-265627, the setting has to be changed from the automatic sheet type detection to the specified sheet type printing, after power is off and on or a cassette is opened and closed. In addition, when printing is performed according to the setting of the automatic sheet type detection, the sheet type detection is performed, and thereby the performance may be deteriorated. When a cassette is opened and closed while printing is not performed, the possibility of sheet replacement is high, whereby, if printing is performed without performing a sheet type detection, image defect may occur due to inappropriate temperature adjustment for fixing.

However, when the sheets run out during printing and new sheets are replenished, there is a high possibility that sheets of the same type may be replenished. In such a case, if printing is continued assuming that the same type sheet is to be used, there will be no problem in many cases. However, if a sheet type detection is performed, performance may be deteriorated.

SUMMARY OF THE INVENTION

To address the above, a printing apparatus reduces the possibility of performance deterioration due to sheet type detection at a printing restart time from a sheet empty state occurred during printing. According to an aspect of the present invention, a printing apparatus includes a detecting unit configured to detect a sheet type of a sheet used for a print job, a determination unit configured to determine, in a case where a cassette is opened, whether the cassette is used for the print job and the print job is suspended because of a sheet empty state, a holding unit configured to hold, in a case where the determination unit determines that the cassette is used for the print job and the print job is suspended because of the sheet empty state, the sheet type detected by the detecting unit, and an instruction unit configured to instruct, in a case where printing is restarted, a printer unit to restart printing of the print job using the sheet type held by the holding unit.

Further features of the present invention will become apparent from the following description of exemplary embodiments with reference to the attached drawings.

DESCRIPTION OF THE EMBODIMENTS

Exemplary embodiments of the present invention will be described below with reference to the attached drawings.

Figure 1:
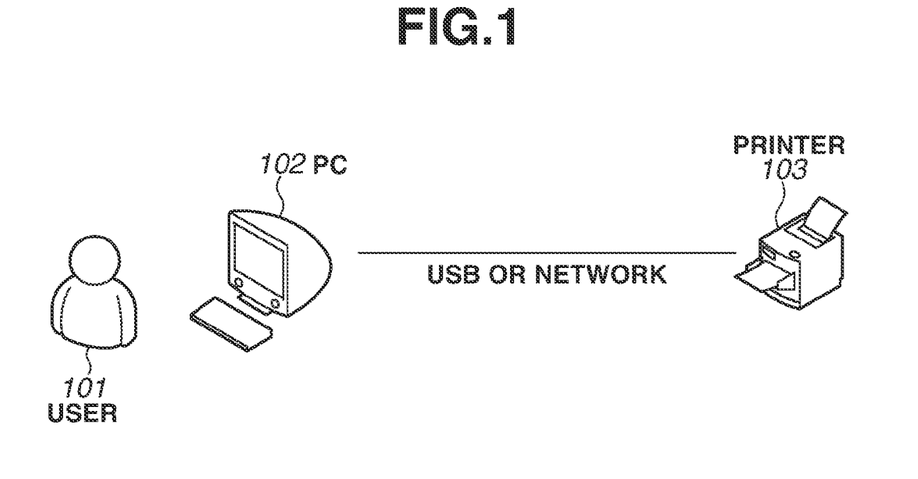
FIG. 1 is a diagram illustrating an example system configuration of a printing system.

FIG. 1 is a diagram illustrating an example system configuration of a printing system according to a first exemplary embodiment. A printer 103 has a sheet size and a sheet type as sheet setting information of a cassette, each of which is registered therein by a manual registration by a user or an automatic registration by an automatic detection. In the present exemplary embodiment, it is assumed that, even in a case of sheet size automatic registration, the sheet size has already been registered because an automatic registration is performed when the sheets are set. On the other hand, as for the sheet type, in a case of automatic registration, there exists a sheet type not-registered state during a time period from an initial state where the sheets are set in a cassette to a time when the sheet type detection is performed. The definition of the sheet type not-registered state will be described below with reference to FIG. 3.

FIG. 1 is a diagram illustrating an example system configuration of a printing system. A printer 103 is connected with a personal computer (PC) 102 via a universal serial bus (USB) or a network. A user 101 can perform optional settings and printing instructions to the printer 103 through an application operating on the PC 102.

Figure 2:
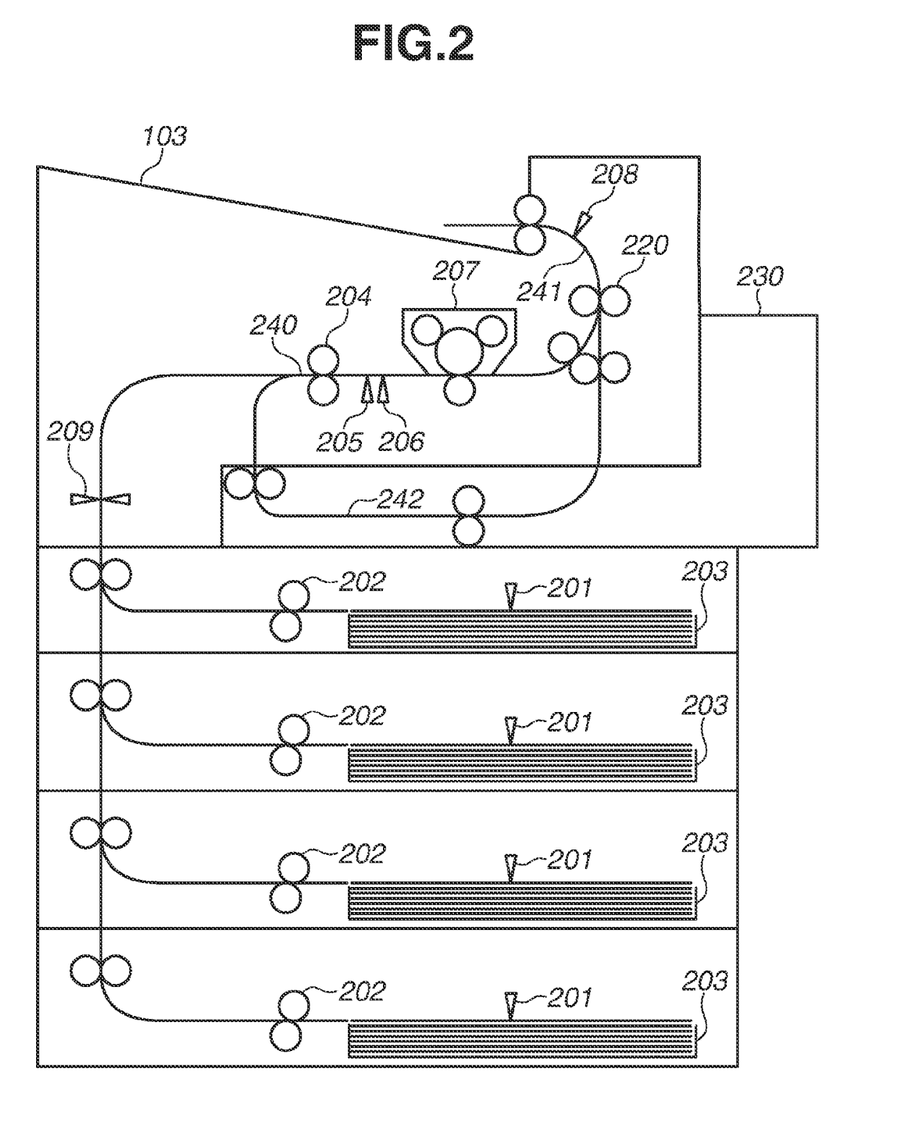
FIG. 2 is a cross sectional view of a printer.

FIG. 2 is a cross sectional view of the printer 103. The printer 103 includes sheet cassettes 203, an image forming unit 207, a main conveyance path 240, a discharge conveyance path 241, a reverse conveyance path 242, and a two-sided conveyance unit 230. Further, in order to convey a sheet through each conveyance path, the printer 103 includes a plurality of rollers, for example, feed rollers 202, a registration roller 204, and a discharge roller 220. Further, in order to detect a state of a sheet in the printer 103, the printer 103 includes a plurality of sensors, for example, sheet presence sensors 201, a registration sensor 205, a sheet detection sensor 206, a sheet discharge sensor 208, and a sheet type detection sensor 209.

Each of the sheet cassettes 203 functions as a sheet feeding unit to feed a sheet on which an image is to be formed into a main body of the printer 103.

The image forming unit 207 includes an exposure unit, a photosensitive drum, and a development unit, for forming an image on the sheet. The image forming unit 207 forms an electrostatic latent image on the photosensitive drum (image bearing member) by the exposure unit. The electrostatic latent image is formed according to image data received by a controller unit 413 described below. The formed electrostatic latent image is developed by the development unit, and transferred onto a sheet at a predetermined transfer position. A fixing device applies heat and pressure to the sheet to fix the toner image formed thereon.

The main conveyance path 240, arranged between the feed rollers 202 and the discharge roller 220, is a conveyance path for forming an image on the sheet. The discharge conveyance path 241, arranged between the discharge roller 220 and outside the apparatus (i.e., printer 103), is a conveyance path for discharging the sheet outside the apparatus. Further, the discharge conveyance path 241 is, when two-sided printing is performed, a conveyance path for conveying a sheet, on one surface of which an image has been formed, to the reverse conveyance path 242. The reverse conveyance path 242, arranged between the discharge roller 220 and the registration roller 204, is a conveyance path for feeding a front/back reversed sheet to the main conveyance path 240.

The feed roller 202 feeds sheets stored in the sheet cassette 203 into the apparatus one by one. The registration roller 204 is a roller for adjusting a timing for transferring an image, by the image forming unit 207, on the conveyed sheet. The discharge roller 220 is a roller for discharging a sheet outside the apparatus. Further, the discharge roller 220, when two-sided printing is performed, after conveying a sheet, on one surface of which an image has been formed, to the discharge conveyance path 241, rotates reversely to convey the sheet to the reverse conveyance path 242.

The sheet presence sensors 201 is a sensor to detect whether a sheet is present in the sheet cassette 203. The registration sensor 205, the sheet detection sensor 206, and the sheet discharge sensor 208 detect a conveyed sheet. These sensors may be configured of mechanical switches or optical sensors. The registration sensor 205 is used to adjust the transfer timing between a conveyed sheet and a toner image formed on the photosensitive drum. Further, the registration sensor 205 is used to measure the length of a sheet in the sub-scanning direction. The length of a sheet in the sub-scanning direction can be obtained based on the time period during which the registration sensor 205 is detecting the conveyed sheet, and the sheet conveyance speed. The sheet detection sensor 206 detects the presence of a sheet at both ends of the main conveyance path 240, to obtain the length of the sheet in the main scanning direction.

The sheet type detection sensor 209 is a sensor for detecting a thickness and/or a surface property of a sheet (e.g., roughness of a sheet). For example, the sheet type detection sensor 209 disposed on the back side of a sheet can determine the thickness of the sheet based on a waveform of a signal of a ultrasonic wave projected from the front side of the paper. Further, the sheet type detection sensor 209 can determine the surface property of a sheet based on a waveform of a signal of reflected light projected from the front side of a sheet. When the sheet type detection is performed, after a sheet is fed from the sheet cassette 203, a sheet type is determined based on the thickness and the surface property measured with the method described above at the position of the sheet type detection sensor 209.

Figure 3:
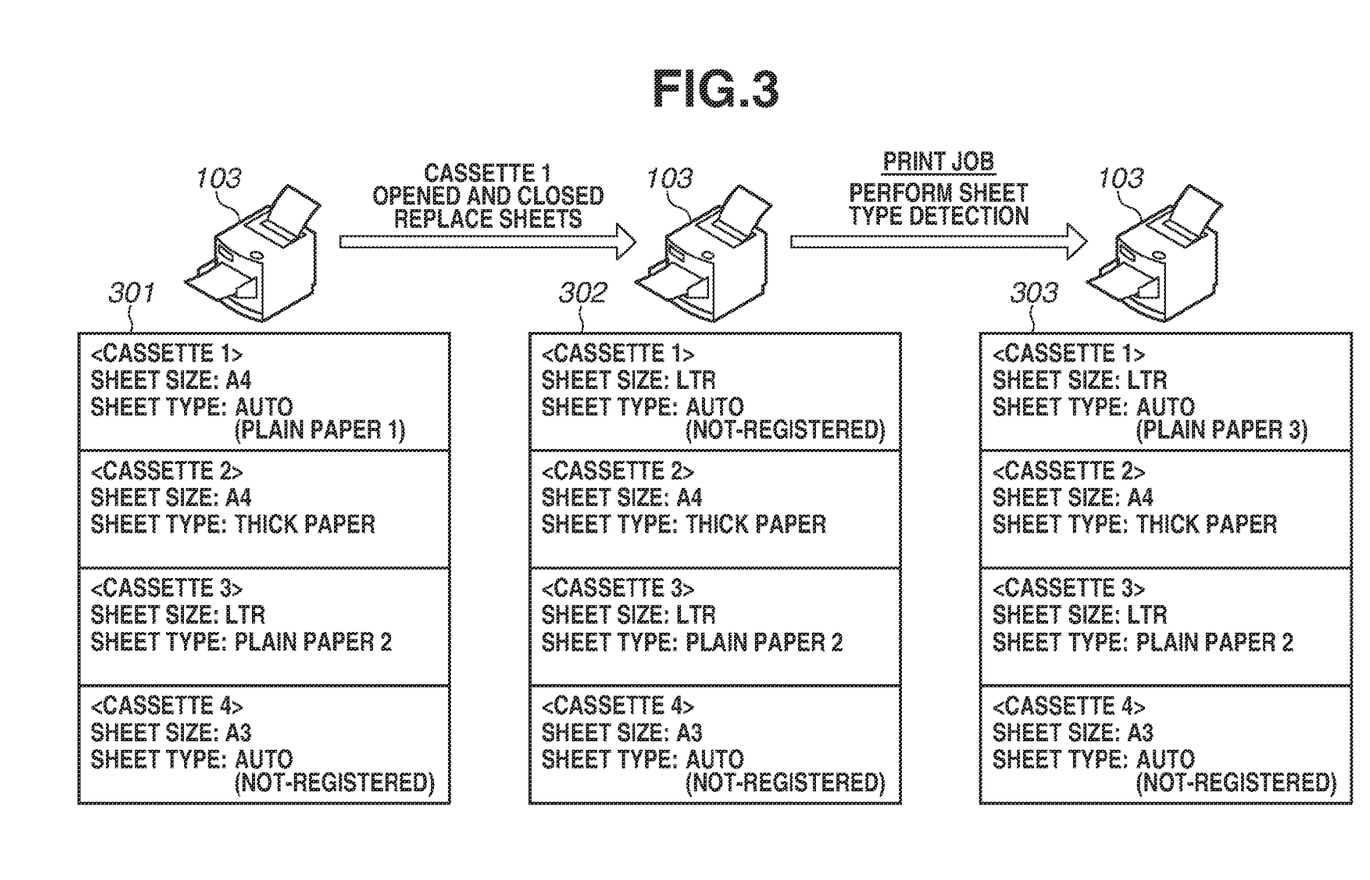
FIG. 3 is a diagram illustrating a sheet type registration using sheet type detection.

FIG. 3 is a diagram illustrating a sheet type registration using the sheet type detection. FIG. 3 illustrates an operation of registering a sheet type by performing a sheet type detection along with the process of a print job, from a state in which the sheet setting information (sheet type) of a cassette of the printer 103 is not registered. The printer 103 includes four cassettes. Pieces of sheet setting information 301, 302, and 303 each indicate a state of sheet setting information set to a cassette of the printer 103. In a cassette 1 with the sheet setting information 301, A4 is registered as the sheet size, the automatic detection is set as the sheet type, and a plain paper 1 is registered therein as a previous detection result. Then, a sheet replacement is performed, and after the cassette 1 is opened and closed, the sheet setting information is changed to the sheet setting information 302. At that time, LTR is registered as a sheet size, and the sheet type becomes a not-registered state. Then, when the printer 103 receives a print job to perform printing on a sheet fed from the cassette 1, and a sheet type detection is performed. As a result thereof, the sheet setting information is changed to sheet setting information 303. As a result, a plain paper 3 is registered as a detection result of the sheet type of the cassette 1 in the sheet setting information 303.

Figure 4:
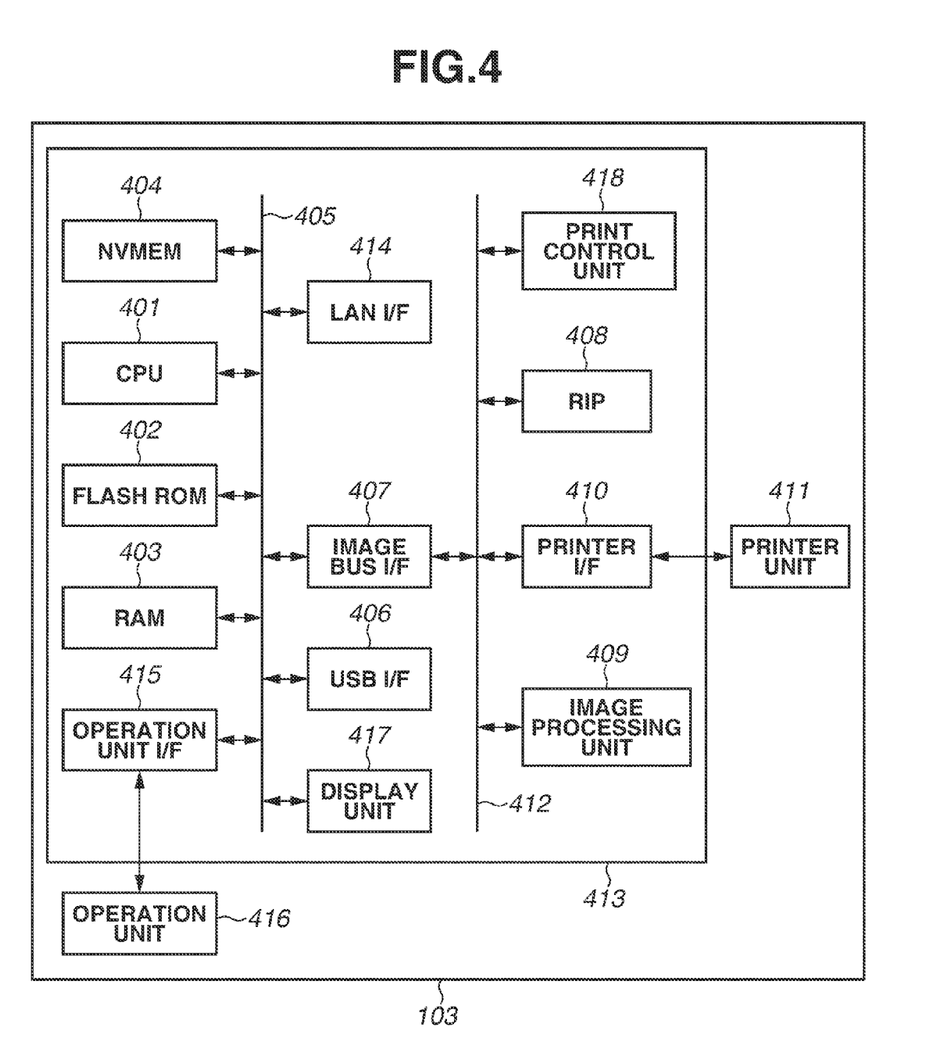
FIG. 4 is a block diagram illustrating an example hardware configuration of a controller unit of the printer.

FIG. 4 is a block diagram illustrating an example hardware configuration of the controller unit 413 in the printer. The controller unit 413 is connected to a printer unit 411 functioning as an image output device so as to input and output image data and device information. A CPU 401 is a processor for controlling an entire system. A random access memory (RAM) 403 is a system work memory for the CPU 401 to operate, and is also a program memory for recording a program and an image memory for temporarily recording image data. A nonvolatile memory (NVMEM) 404 records setting information and the like. However, the NVMEM 404 may be another storage device such as a hard disc drive. An operation unit 416 includes keys used by a user to operate the device and light-emitting diodes (LEDs) for indicating the state of the device. An operation unit interface (I/F) 415 is an interface with the operation unit 416, and transmits control information for the LED held in the operation unit 416. Further, the operation unit I/F 415 transfers information input by a user via the operation unit 416, to the CPU 401. The display unit 417 displays a message for notifying a user of the state of the printer unit 411 and the information input by a user. A flash read only memory (FLASHROM) 402 is a rewritable nonvolatile memory, to record various control programs for controlling the system. A USB I/F 406 enables a USB connection with an external apparatus. A local area network (LAN) I/F 414 enables a LAN connection with an external apparatus. These devices are arranged on a system bus 405. The CPU 401 executes processing based on a program recorded in the FLASHROM 402 or the like and loaded in the RAM 403, whereby the function of the printer 103 and processing of flowcharts described below can be realized.

An image bus I/F 407 connects the system bus 405 and an image bus 412 that can transfer image data at high speed, and is a bus bridge for converting a data structure. The image bus 412 is configured of a Peripheral Component Interconnect (PCI) bus or an IEEE 1394 bus. On the image bus 412, the following devices are arranged.

A raster image processor (RIP) 408 rasterizes vector data such as a page description language (PDL) code into a bitmap image. A printer I/F 410 connects the printer unit 411 and the controller unit 413, to convert image data between synchronous and asynchronous systems, transmit and receive control commands, and supply power. An image processing unit 409 performs correction, processing, and editing on an input image data, and also performs correction for the printer and resolution conversion on print output image data. Further, in addition thereto, the image processing unit 409 performs rotation of image data, and performs compression/decompression processing on multi-value image data based on Joint Photographic Experts Group (JPEG), and on binary image data based on Joint Bi-level Image experts Group (JBIG), Modified Modified READ (MMR), Modified Huffman (MH), and the like. A print control unit 418 analyzes input image data and print setting information thereof. Further, the print control unit 418 compares the state of the printer unit 411 and the setting information stored in the NVMEM 404 with the input image data and the print setting information thereof. Then, the print control unit 418 stops print execution when the comparison result is not appropriate for print execution, and sends a notification to the CPU 401 to display an error message on the display unit 417. For example, the print control unit 418 performs, when the cassette 1 is specified in the print setting information of the input image data and the plain paper is specified as a sheet type, the following processing. Specifically, the print control unit 418 notified the CPU 401 of an error indicating that sheet replacement is required, when the sheet type setting information of the cassette 1 held in the NVMEM 404 does not indicate the plain paper.

Further, the print control unit 418 receives, from the printer unit 411, information indicating the printing of which page is completed, and manages the state of progress of the printing. The printer unit 411 is a unit for converting raster image data into an image on a sheet. The methods of conversion may include an electrophotographic method that uses a photosensitive drum or a photosensitive belt, and an ink-jet method in which ink is discharged from a minute nozzle array to directly print an image on a sheet, and any methods can be employed. The print control unit 418 starts an activation of printing operation in response to an instruction from the CPU 401.

Figure 5A:
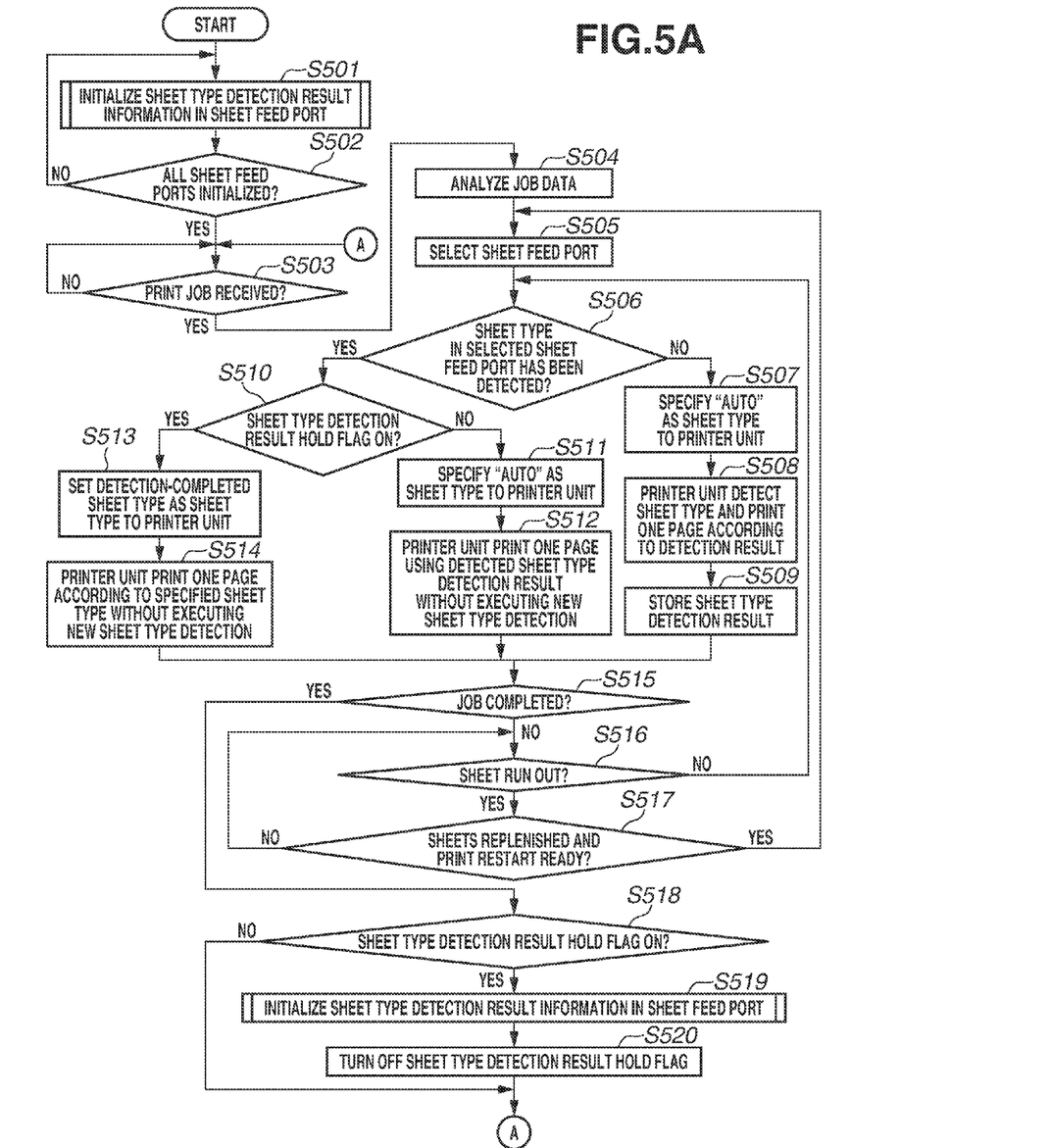
FIGS. 5A, 5B, and 5C are flowcharts respectively illustrating an example of information processing from a reception of a print job to an execution of printing, an example of initialization processing of sheet type detection result information, and an example of cassette open check processing (first).

FIG. 5A is a flowchart illustrating an example of information processing from powering up the printer 103 to receiving a print job and executing printing.

At a time of powering up, the CPU 401 initializes a sheet type detection result information about all sheet cassettes stored in the RAM 403 held in the printer 103, in steps S501 and S502. The initialization of the sheet type detection result information is desirably performed when the sheets in the sheet cassette 203 are likely to be replaced, and in the present exemplary embodiment, it is when the power is on and the sheet cassette 203 is opened.

Figure 5B:
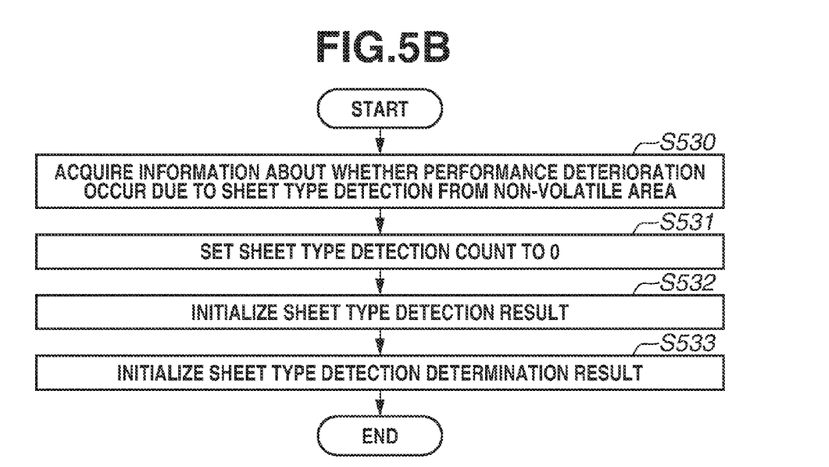

The initialization processing of sheet type detection result information performed in step S501 will be described with reference to FIG. 5B. The sheet type detection result information of each sheet cassette includes two pieces of information illustrated in FIG. 6, and these pieces of information held in the RAM 403 is initialized in steps S530 to S533.

Figure 6:
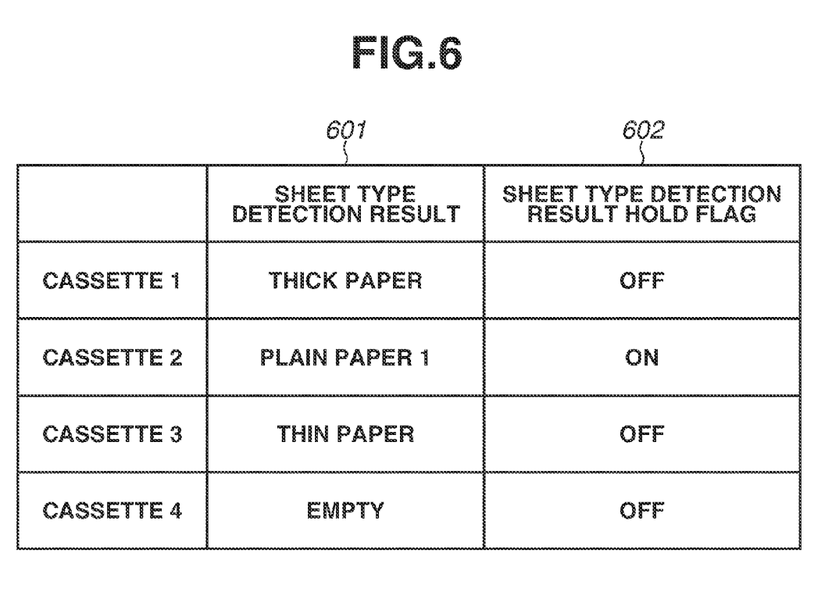
FIG. 6 is a table illustrating an example of sheet type detection result information (first).

More specifically, the CPU 401 acquire information about whether performance is deteriorated due to the sheet type detection, from the nonvolatile storage area of, for example, the NVMEM 404 in step S530. Next, the CPU 401 sets the sheet type detection count to "0" in step S531. Next, the CPU 401 sets a sheet type detection result 601 to an initial value in step S532. Next, the CPU 401 sets a sheet type detection determination result to an initial value in step S533. In the present exemplary embodiment, the sheet type detection result 601 is a sheet type detected as a result of the sheet type detection. The sheet type detection result hold flag 602 is a flag indicating that the sheet type detection result 601 is maintained without being initialized even if a cassette is opened when the sheets run out during printing and new sheets are replenished to restart printing. The details of the sheet type detection result hold flag 602 will be described below.

Figure 5C:
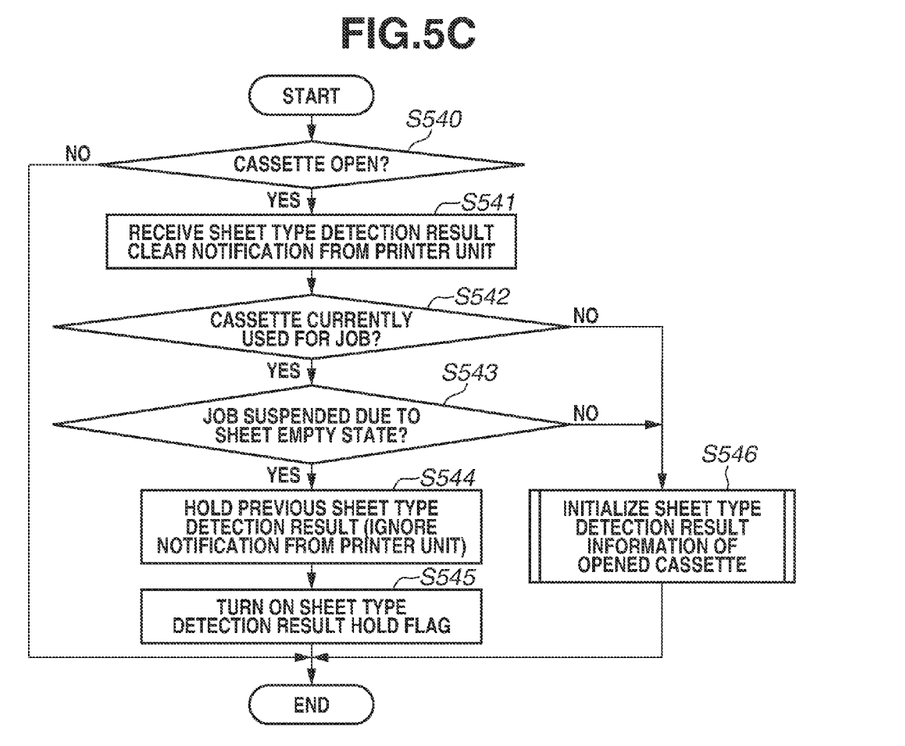

Further, the detection of whether the sheet cassette 203 is opened is constantly performed in parallel with the processing illustrated in the flowchart of FIG. 5A. The processing thereof is illustrated in FIG. 5C. In step S540, the CPU 401 is constantly monitoring whether the sheet cassette 203 is opened by inquiring of the printer unit 411 through the printer I/F 410. In step S540, if the CPU 401 determines that the cassette is not open (YES in step S540), the CPU 401 performs no operation and, after a predetermined period, the CPU 401 performs the processing of step S540 again at the next cassette open processing check processing.

In step S540, if the CPU 401 determines that the cassette is open (YES in step S540), the processing proceeds to step S541. In step S541, the CPU 401 receives a sheet type detection result clear notification held by the printer unit 411 from the printer unit 411.

Then, in step S542, the CPU 401 determines whether the opened cassette is currently used for the print job.

In step S542, if the CPU 401 determines that the opened cassette is currently used (YES in step S542), the processing proceeds to step S543. In step S543, the CPU 401 determines whether the print job is suspended due to the sheet empty state.

In step S543, if the CPU 401 determines that the job is suspended due to the sheet empty state (YES in step S543), the processing proceeds to step S544. In that case, the printing is not completed, and it is highly likely that the same type of sheets will be replenished even if the cassette is opened and closed. Therefore, in step S544, the CPU 401 ignores the sheet type detection result clear notification from the printer unit 411, and maintains the sheet type detection result 601 obtained when the previous sheet type detection is performed without initializing the sheet type detection result 601.

Further, in step S545, the CPU 401 turns on the sheet type detection result hold flag 602 of the opened cassette.

If the CPU 401 determines "NO" in step S542 or S543, the processing proceeds to step S546. In step S546, the CPU 401 initializes the sheet type detection result 601 of the opened cassette.

Referring back to the flowchart in FIG. 5A, in step S503, the CPU 401 monitors whether a print job is received.

If, in step s503, the CPU 401 determines that a print job is received (YES in step S503), the processing proceeds to step S504. In step S504, the CPU 401 instructs the print control unit 418 to analyze the received job data. By analyzing the job data, the size and type of the sheet specified by the user and information about the cassette can be known. Then, the CPU 401 stores the analysis result in the RAM 403. In step S503, if the CPU 401 determines that a print job is not received (No in step S503), the CPU 401 repeats the processing in step S503.

In step S505, the CPU 401 selects a cassette suitable for feeding sheets based on the size and type of the sheet specified by the user and cassette sheet setting information analyzed by the print control unit 418. At that time, the sheet type is set to "AUTO" as the cassette sheet setting information, the CPU 401 performs the sheet type detection as described referring to FIG. 3, then registers the sheet type into the cassette sheet setting information. The registered sheet type is the sheet type detection result 601. The operation example will be described below assuming that the sheet type is set to "AUTO" as the cassette sheet setting information.

After a sheet feed port is selected in step S505, in step S506, the CPU 401 determines whether the sheet type in the selected sheet feed port has been detected. If the sheet type detection result 601 is not initialized, the CPU 401 determines that the sheet type has been detected.

In step S506, if the sheet type has not been detected (NO in step S506), since the sheet type is "AUTO" as the cassette sheet setting information, the sheet type detection is necessary to determine to perform printing suitable for which sheet type. Therefore, if the sheet type has not been (No in step S506), the processing proceeds to step S507. In step S507, the print control unit 418 specifies "AUTO" as the sheet type to instruct the printer unit 411 to perform printing.

In step S507, upon receiving the print instruction in which "AUTO" is specified as the sheet type, in step S508, the printer unit 411 performs the sheet type detection to perform printing suitable for the detected sheet type. In the present exemplary embodiment, specifying "AUTO" as the sheet type is the execution instruction of the sheet type detection to the printer unit 411, but any other instruction methods may be employed to instruct the sheet type detection.

If the sheet type detection has been performed in step S508, the CPU 401 is notified of the sheet type detection result from the printer unit 411, then in step S509, the CPU 401 stores the notified sheet type detection result in the sheet type detection result 601.

If the sheet type has been detected (YES in step S506), the processing proceeds to step S510. In step S510, the CPU 401 checks whether the sheet type detection result hold flag 602 is ON. In step S510, if the sheet type detection result hold flag 602 is OFF (NO in step S510), the processing proceeds to step S511. In this case, the CPU 401 can determine that it is not the print restart due to printing sheet empty state during printing. Therefore, in step S511, the print control unit 418 specifies "AUTO" as the sheet type to the printer unit 411 to perform a print instruction according to the cassette sheet setting information "AUTO", similar to step S507.

Since the sheet type has been detected, in step S512, the printer unit 411 does not perform the sheet type detection, and performs printing using the previously detected sheet type detection result held in the printer unit.

In step S510, if the sheet type detection result hold flag 602 is ON (YES in step S510), the processing proceeds to step S513. In this case, the CPU 401 can determine that it is a print restart due to printing sheet empty state during printing. At that time, in step S513, the print control unit 418 specifies as a sheet type the sheet type held as the sheet type detection result 601 in the printer unit 411 to instruct the printer unit 411 to perform printing.

The printer unit 411, when receiving a print instruction in which a sheet type other than "AUTO" is specified as the sheet type in step S513, does not perform the sheet type detection, and performs printing using the specified sheet type.

The processing described above can prevent performance deterioration caused by the sheet type detection at a time of print restart performed when sheets run out during printing.

When printing of one page is completed in step S509, 512, or 514, in step S515, the CPU 401 determines whether the print job has been completed.

If the CPU 401 determines that the print job has not been completed (NO in step S515), the processing proceeds to step S516. In step S516, the CPU 401 determines whether the sheets run out. The CPU 401 detects a presence of sheet using the sheet presence sensors 201.

If the sheets have not run out (No in step S516), the CPU 401 repeats the processing in step S506 and subsequent steps to perform printing of one more page.

If the sheets have run out (YES in step S516), the processing proceeds to step S517. In step S517, the CPU 401 checks whether sheets are replenished and the print restart is ready. If the CPU 401 determines that the print restart is not ready (NO in step S517), the CPU 401 repeats the processing in steps S516 and S517 until sheets are replenished and print restart is ready. If the CPU 401 determines that sheets are replenished and the print restart is ready (YES in step S517), the processing returns to step S505. In step S505, the CPU 401 performs the sheet feed port determination processing again to restart the print job.

If the CPU 401 determines that the print job has been completed (YES in step S515), the processing proceeds to step S518. In step S518, the CPU 401 checks whether the sheet type detection result hold flag is ON. If the sheet type detection result hold flag is ON, it means that the sheet type detection has not been performed after the cassette is opened.

If the sheet type detection result hold flag is ON (YES in step S518), the processing proceeds to step S519. In step S519, the CPU 401 initializes the cassette sheet type detection result information used at the time of job completion. On the other hand, if the sheet type detection result hold flag is OFF (NO in step S518), the CPU 401 returns the processing to step S503.

In step S520, the CPU 401 also turns OFF the sheet type detection result hold flag.

Then, the CPU 401 returns the processing to step S503.

By performing above-described initialization, since the sheet type detection is performed at the beginning of the next job, printing suitable for the sheet type can be performed.

In addition, in the present exemplary embodiment, the initialization of the sheet type detection result information is performed in steps S518, 519, and 520 after the job is completed. This is because there is a possibility that the sheet type may have been changed after the cassette is opened and closed. However, as described above, even if the cassette is opened and closed after the sheets run out, since the printing is not completed, it is highly likely that the same type of sheets will be replenished.

Therefore, the CPU 401 may not perform the processing in steps S518, 519, and 520 assuming that the sheet type of the sheets in the cassette is the same as the previous sheet type detection result. In this case, the sheet type detection result information is initialized when power OFF and ON or cassette open and close is carried out.

In the first exemplary embodiment, the processing to prevent the performance deterioration due to the sheet type detection (the processing to hold the previous sheet type detection result performed in steps S544 and 545) is necessarily performed, if it is a print restart carried out in the sheet empty state during printing. However, if the sheet type detection is not performed after the cassette is opened and closed, and the sheet type might have been changed by any chance, there may be a risk of image defect caused by an inappropriate temperature control fixing.

Figure 7:
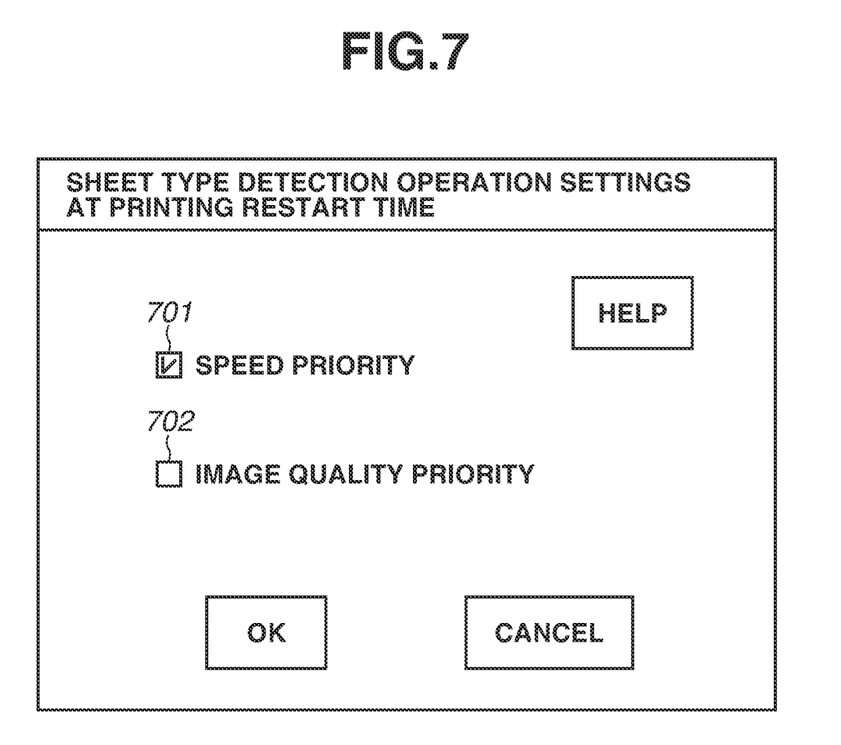
FIG. 7 is a diagram illustrating an example user interface (UI) screen.

Thus, it is useful to provide a UI (screen) with which the user can select which to prioritize, speed or image quality, and the processing may be switched based on the setting information. FIG. 7 illustrates an example of UI. According to the control of the CPU 401, the UI is displayed on the display unit 417. The user can select a check button of "speed priority" 701 or "image quality priority" 702 on the operation unit 416, and then press "OK" button. With this operation, the CPU 401 stores setting information of "speed priority" or "image quality priority" in the NVMEM 404.

Figure 8:
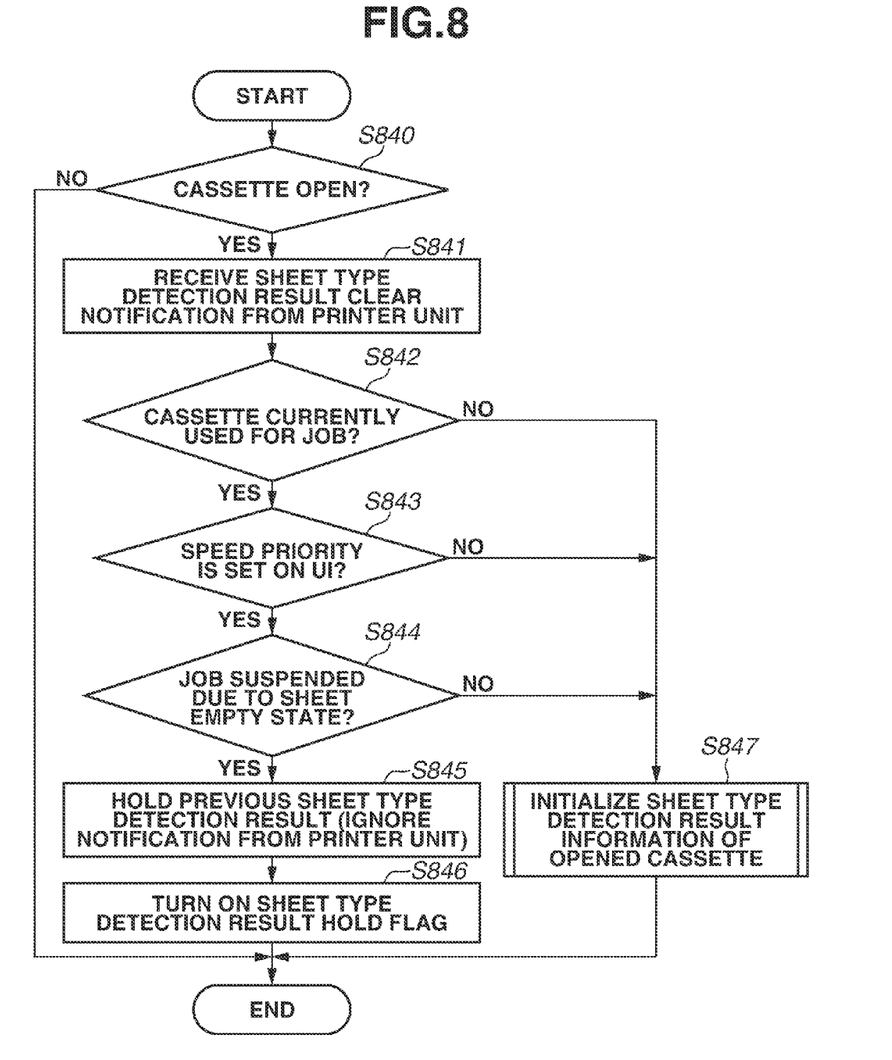
FIG. 8 is a flowchart illustrating an example of cassette open check processing (second).

FIG. 8 is a flowchart illustrating an example of cassette open check processing according to a second exemplary embodiment. The processing illustrated in FIGS. 5A and 5B is the same as that of the first exemplary embodiment, and thus the description thereof is omitted. Further, regarding the processing in FIG. 8, only differences with the processing in FIG. 5C will be described.

The processing performed in steps S840 to S842 is similar to that performed in steps S540 to S542. In step S842, if the CPU 401 determines that the opened cassette is currently used for the job, the processing proceeds to step S843. In step S843, the CPU 401 determines whether the "speed priority" or "image quality priority" is selected on the UI illustrated in FIG. 7 based on the information held in the NVMEM 404. If the CPU 401 determines that the "speed priority" is selected (YES in step S843), the processing proceeds to step S844. The processing to be performed in step S844 is similar to that performed in S543, and the processing to be performed in steps S844 to S846 is also similar to that performed in steps S543 to S545.

If the CPU 401 determines that the image quality priority is selected (NO in step S843), the processing proceeds to step S847. In step S847, the CPU 401 initializes the cassette sheet type detection result information so as to perform the sheet type detection without fail after the cassette is opened and closed.

With such processing, the sheet type detection can be performed without fail after the cassette is opened and closed if the user intends to prioritize the image quality.

In the first exemplary embodiment, the processing to prevent the performance deterioration due to the sheet type detection (the processing to hold the previous sheet type detection result performed in steps S544 and 545) is performed without fail, if it is a print restart carried out in the sheet empty state during printing. However, in a case of a cassette where the performance is not deteriorated even if the sheet type detection is performed, it is desirable to perform the sheet type detection because the risk described in the second exemplary embodiment is reduced.

Figure 9:
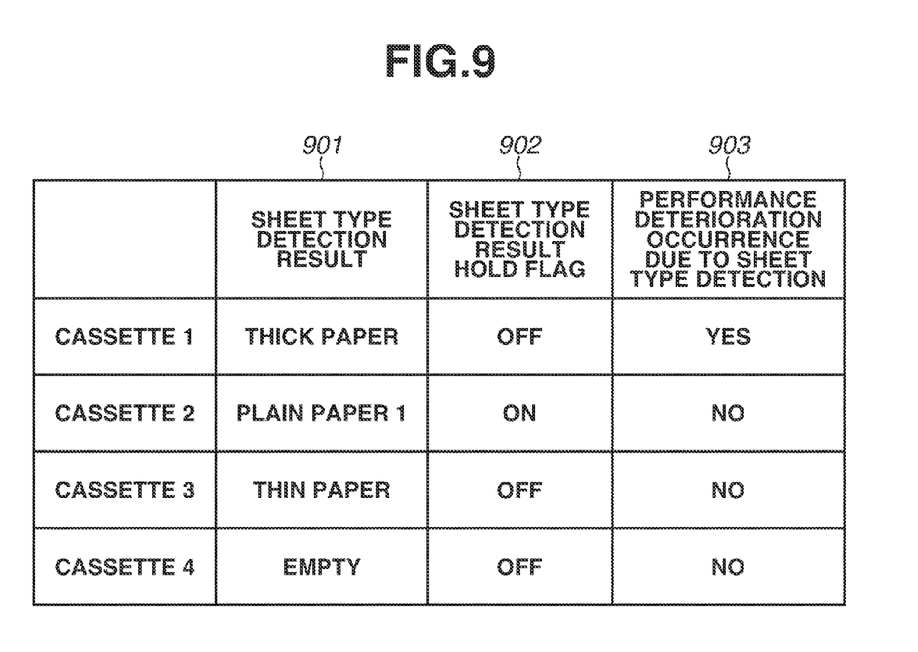
FIG. 9 is a table illustrating an example of sheet type detection result information (second).

Therefore, in addition to the sheet type detection results 601 and 602, described in the first exemplary embodiment, a "performance deterioration occurrence due to sheet type detection" 903 may be added to switch the processing according to whether the performance deterioration occurs. The "performance deterioration occurrence due to sheet type detection" 903 indicates whether the performance is deteriorated with the cassette when the sheet type detection is performed therewith. For example, it is assumed that the "performance deterioration occurrence due to sheet type detection" 903 is set in advance, and the value thereof is not initialized by the processing such as the initialization of the sheet type detection result information. FIG. 9 illustrates an example of sheet type detection result information according to a third exemplary embodiment. The sheet type detection result 901 and the sheet type detection result flag 902 in FIG. 9 are the same as the sheet type detection result 601 and the sheet type detection result flag 601 in FIG. 6, respectively. The value of "NO" and "YES" in the "performance deterioration occurrence" 903 may be configured to be changeable by the CPU 401 according to the user operation via the UI displayed on the display unit 417. The "performance deterioration occurrence due to sheet type detection" 903 is an example of information for each cassette indicating whether the performance deterioration occurs due to the sheet type detection.

Figure 10:
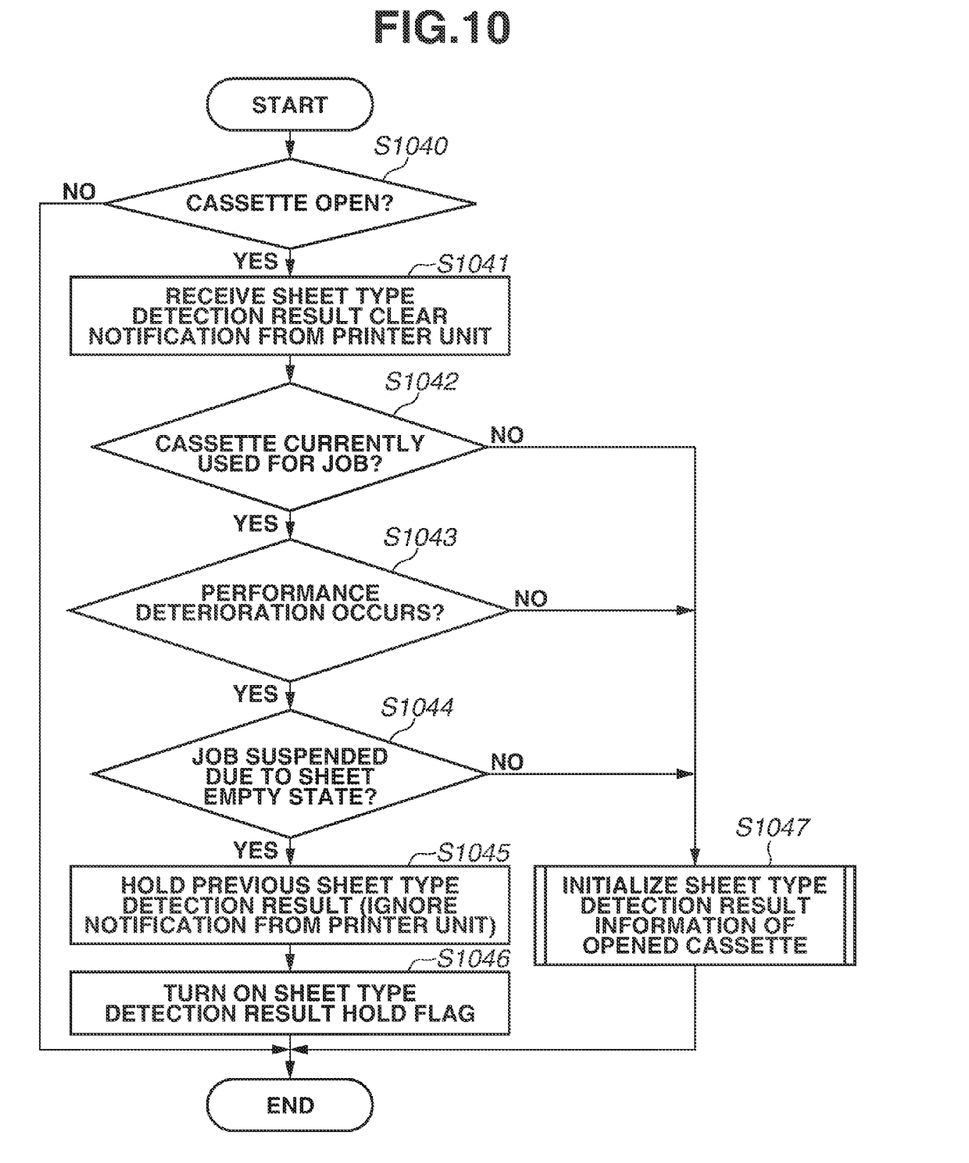
FIG. 10 is a flowchart illustrating an example of cassette open check processing (third).

FIG. 10 is a flowchart illustrating an example of cassette open check processing according to the third exemplary embodiment. The processing illustrated in FIGS. 5A and 5B is the same as that of the first exemplary embodiment, and thus the description thereof is omitted. Further, regarding the processing in FIG. 10, only differences with the processing in FIG. 5C will be described.

The processing to be performed in steps S1040 to S1042 is similar to that performed in steps S540 to S542. In step S1042, if the CPU 401 determines that the opened cassette is currently used for the print job, the processing proceeds to step S1043. In step S1043, the CPU 401 determines whether the performance deterioration due to the sheet type detection occurs with the cassette. The CPU 401 performs the determination in step S1043 based on the "performance deterioration occurrence due to sheet type detection" 903 obtained by the sheet type detection. If the CPU 401 determines that performance deterioration occurs (YES in step S1043), the processing proceeds to step S1044. The processing to be performed in step S1044 is similar to that performed in step S543, and the processing to be performed in steps S1044 to S1046 is similar to that performed in steps S543 to S545.

If the CPU 401 determines that the performance deterioration does not occur (NO in step S1043), the processing proceeds to step S1047. In step S1047, the CPU 401 initializes the sheet type detection result information of the cassette because the performance deterioration does not occur even if the sheet type detection is performed after the cassette is opened and closed.

With such processing, the sheet type detection is performed without fail after the cassette is opened and closed in a case of a cassette with which the performance is not deteriorated even if the sheet type detection is performed. Therefore, the risk of image defect caused by an inappropriate temperature control fixing can be reduced without deteriorating the performance.

Other Embodiments

The exemplary embodiments of the present invention can be implemented by executing the following processing. That is, software (program) to implement the functions of the above-described exemplary embodiments is supplied to a system or apparatus via a network or various storage media. A computer (or central processing unit (CPU) or micro processing unit (MPU)) of the system or apparatus reads out and executes the program. Further, the exemplary embodiments of the present invention can be implemented by circuits (e.g., application specific integrated circuits (ASIC)) that realize one or more functions of the above-described exemplary embodiments.

The exemplary embodiments of the present invention has been described above. However, the present invention is not limited to such specific embodiments.

With above-described processing according to various exemplary embodiments, the possibility of performance deterioration due to sheet type detection occurred at a printing restart time from a sheet empty state occurred during printing, can be reduced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-126895, filed Jun. 24, 2015, which is hereby incorporated by reference herein in its entirety.

What is claimed is:

1. A printing apparatus comprising:
   at least one processor;
   a sensor configured to detect a sheet type of a sheet used for a print job;
   a determination unit configured to determine, in a case where a cassette is opened, whether the cassette is used for the print job and the print job is suspended because of a sheet empty state;
   a storage configured to store, in a case where the determination unit determines that the cassette is used for the print job and the print job is suspended because of the sheet empty state, the sheet type detected by the sensor; and
   an instruction unit configured to instruct, in a case where printing is restarted, a printer to restart printing of the print job using the sheet type stored by the storage,
   wherein the determination unit further determines whether the printing apparatus is set to a speed priority mode at a printing restart time,
   wherein the storage stores the sheet type detected by the sensor in a case where the determination unit determines that (i) the cassette is used for the print job, (ii) the print job is suspended because of sheet empty state, and (iii) the printing apparatus is set to the speed priority mode, and
   wherein the determination unit and the instruction unit are each implemented by at least one of the at least one processor.

2. The printing apparatus according to claim 1, further comprising a display configured to display a screen allowing a user to select, at the printing restart time, the speed priority mode or an image quality priority mode,
   wherein the determination unit further determines whether the printing apparatus is set to the speed priority mode at a printing restart time based on a selection of the user via the screen.

3. The printing apparatus according to claim 1,
   wherein the determination unit further determines whether the cassette is a cassette to be subjected to a performance deterioration due to the sheet type detection, and
   wherein the storage stores the sheet type detected by the sensor in a case where the determination unit further determines that (i) the cassette is used for the print job, (ii) the print job is suspended because of sheet empty, and (iii) the cassette is a cassette to be subjected to performance deterioration due to the sheet type detection.

4. The printing apparatus according to claim 3, wherein, based on information for each cassette indicating whether performance deterioration due to the sheet type detection occurs, the determination unit further determines whether an opened cassette is a cassette to be subjected to performance deterioration due to the sheet type detection.

5. A control method for a printing apparatus, the control method comprising:
   detecting a sheet type of a sheet used for a print job;
   determining, in a case where a cassette is opened, whether the cassette is used for the print job and the print job is suspended because of a sheet empty state;
   storing, in a case where it is determined that the cassette is used for the print job and the print job is suspended because of the sheet empty state, the detected sheet type; and
   instructing, in a case where printing is restarted, a printer to restart printing of the print job using the stored sheet type,
   wherein determining further includes determining whether the printing apparatus is set to a speed priority mode at a printing restart time, and
   wherein the detected sheet type is stored in a case where it is determined that (i) the cassette is used for the print job, (ii) the print job is suspended because of sheet empty state, and (iii) the printing apparatus is set to the speed priority mode.

6. The control method according to claim 5, further comprising displaying a screen allowing a user to select, at the printing restart time, the speed priority mode or an image quality priority mode,
   wherein determining further includes determining whether the printing apparatus is set to the speed priority mode at a printing restart time based on a selection of the user via the screen.

7. The control method according to claim 5,
   wherein determining further includes determining whether the cassette is a cassette to be subjected to a performance deterioration due to the sheet type detection, and
   wherein the detected sheet type is stored in a case where it further is determined that (i) the cassette is used for the print job, (ii) the print job is suspended because of sheet empty, and (iii) the cassette is a cassette to be subjected to performance deterioration due to the sheet type detection.

8. The control method according to claim 7, wherein, based on information for each cassette indicating whether performance deterioration due to the sheet type detection occurs, determining further includes determining whether an opened cassette is a cassette to be subjected to performance deterioration due to the sheet type detection.

9. A non-transitory computer-readable storage medium storing a program to cause a computer to perform a control method for a printing apparatus, the control method comprising:
   detecting a sheet type of a sheet used for a print job;
   determining, in a case where a cassette is opened, whether the cassette is used for the print job and the print job is suspended because of a sheet empty state;
   storing, in a case where it is determined that the cassette is used for the print job and the print job is suspended because of the sheet empty state, the detected sheet type; and
   instructing, in a case where printing is restarted, a printer to restart printing of the print job using the stored sheet type,
   wherein determining further includes determining whether the printing apparatus is set to a speed priority mode at a printing restart time, and
   wherein the detected sheet type is stored in a case where it is determined that (i) the cassette is used for the print job, (ii) the print job is suspended because of sheet empty state, and (iii) the printing apparatus is set to the speed priority mode.

10. The non-transitory computer-readable storage medium according to claim 9, the control method further comprising displaying a screen allowing a user to select, at the printing restart time, the speed priority mode or an image quality priority mode,
    wherein determining further includes determining whether the printing apparatus is set to the speed priority mode at a printing restart time based on a selection of the user via the screen.

11. The non-transitory computer-readable storage medium according to claim 9,
    wherein determining further includes determining whether the cassette is a cassette to be subjected to a performance deterioration due to the sheet type detection, and
    wherein the detected sheet type is stored in a case where it further is determined that (i) the cassette is used for the print job, (ii) the print job is suspended because of sheet empty, and (iii) the cassette is a cassette to be subjected to performance deterioration due to the sheet type detection.

12. The non-transitory computer-readable storage medium according to claim 11, wherein, based on information for each cassette indicating whether performance deterioration due to the sheet type detection occurs, determining further includes determining whether an opened cassette is a cassette to be subjected to performance deterioration due to the sheet type detection.

13. A printing apparatus comprising:
    a sensor configured to detect a sheet type of a sheet conveyed from a cassette;
    a storage configured to store the sheet type detected by the sensor;
    a printer configured to perform a print job based on the sheet type stored in the storage;
    a controller configured to delete the detected sheet type stored in the storage in accordance with opening of the cassette; and
    a determination unit configured to determine whether a cassette that was used for a print job that is currently suspended due to a sheet empty state of the cassette has now been opened,
    wherein, in a case where the determination unit determines that the cassette that was used for the print job that is currently suspended due to the sheet empty state of the cassette has now been opened, the controller does not delete the detected sheet type.

14. The printing apparatus according to claim 13, wherein, in a case where the determination unit determines that another cassette has now been opened where the another cassette is not identical to the cassette that was used for the print job that is currently suspended due to the sheet empty state of the cassette, the controller deletes the detected sheet type.

15. The printing apparatus according to claim 13, wherein, in the case where the determination unit determines that the cassette that was used for the print job that is currently suspended due to the sheet empty state of the cassette has now been opened, the controller deletes the detected sheet type after the job has been completed.

16. The printing apparatus according to claim 13, further comprising a display configured to display a screen allowing a user to select a speed priority mode or an image quality priority mode, wherein, in a case where the determination unit determines that the cassette that was used for the print job that is currently suspended due to the sheet empty state of the cassette has now been opened and the speed priority mode is selected by the user, the controller does not delete the detected sheet type.

\* \* \* \* \*